US005350034A

United States Patent [19]
Sato

[11] Patent Number: 5,350,034
[45] Date of Patent: Sep. 27, 1994

[54] APPARATUS FOR CONTROLLING OPENING ANGLE OF THROTTLE VALVE IN INTERNAL COMBUSTION ENGINE

[75] Inventor: Hideyuki Sato, Isezaki, Japan

[73] Assignee: Japan Electronic Control Systems Co., Ltd., Isezaki City, Japan

[21] Appl. No.: 909,391

[22] Filed: Jul. 8, 1992

[30] Foreign Application Priority Data

Jul. 8, 1991 [JP] Japan .................. 3-166811

[51] Int. Cl.$^5$ .................. B60K 31/00; B60T 8/32
[52] U.S. Cl. .................. 180/197; 180/179; 364/426.02; 364/426.04
[58] Field of Search .............. 180/197, 170, 178, 179; 364/426.02, 426.04

[56] References Cited

U.S. PATENT DOCUMENTS

| | | | |
|---|---|---|---|
| 4,873,640 | 10/1989 | Burk et al. | 180/179 X |
| 4,908,764 | 3/1990 | Etoh | 364/426.04 |
| 4,984,165 | 1/1991 | Muller et al. | 180/197 X |
| 5,198,982 | 3/1993 | Kobayashi | 180/197 X |

FOREIGN PATENT DOCUMENTS 3510176 2/1986 Fed. Rep. of Germany .
64-29633 1/1989 Japan .

Primary Examiner—Joseph D. Pape
Attorney, Agent, or Firm—Foley & Lardner

[57] ABSTRACT

An apparatus for controlling an opening angle of a throttle valve in an internal combustion engine. When an accelerator pedal is depressed by a vehicular driver, an accelerator drum attached onto an end wall of a main body of a single motor is rotated via an accelerator wire and the main body of the motor, a drive axle of the motor held with respect to the main body of the motor, and a rotation axle of the throttle valve are integrally rotated. When control is transferred from the above-described ordinary opening angle control state into a traction control state, the hold function of the motor is released and the motor is driven so as to reduce the opening angle of the throttle valve. It is possible to drive the motor so as to control the opening angle of the throttle valve, with the accelerator pedal released, to achieve an automatic cruise speed control and to drive the motor according to an accelerator pedal operating variable so that an arbitrary characteristic of the throttle valve opening angle control can be acheived.

8 Claims, 1 Drawing Sheet

APPARATUS FOR CONTROLLING OPENING ANGLE OF THROTTLE VALVE IN INTERNAL COMBUSTION ENGINE

BACKGROUND OF THE INVENTION

1. Field of The Invention

The present invention relates generally to an apparatus for driving an engine throttle valve to control its opening angle applicable to an internal combustion engine.

2. Description of The Background Art

Recently, a control for a throttle valve of the internal combustion engine having multiple functions is generalized. The multiple functions are 1) a mere interlocking with an accelerator pedal depressed by an operator; 2) a traction control so as to reduce an opening angle of the throttle valve in order to reduce slips of vehicular tire wheels during a vehicular acceleration; and 3) an automatic cruise control such that a constant vehicular speed is maintained with the accelerator pedal open or not depressed. Simultaneously, a fail safe structure such that an overrun of the engine revolution is suppressed with the opening angle of the throttle valve held at a minimum position during a failure of the engine.

A Japanese Patent Application First Publication No. Showa 64-29633 published on Jan. 31, 1989 exemplifies a previously proposed throttle valve opening angle controlling apparatus in which the traction control is carried out.

In the disclosed Japanese Patent Application First Publication, an accelerator drum is rotated in a direction such that the opening operation of the throttle valve is enabled when the accelerator pedal is depressed. Then, the throttle valve is open which is engaged with the accelerator drum via a lever biased in the open direction of the throttle valve. During the traction control, the throttle valve is driven in a closed direction by means of a motor.

However, since, in the previously proposed throttle valve opening angle controlling apparatus, the motor can be driven only in the closed direction, another driving mechanism for the throttle valve becomes necessary when it is necessary to drive the throttle valve in the closed direction in addition to the open direction as in the case of the automatic cruise speed control.

In addition, in a case where the traction control is carried out, a structure of the throttle opening angle controlling apparatus becomes complex since the motor is used to close the throttle valve against a biasing force in the open direction of the lever. Furthermore, since the throttle valve is directly biased in the open direction, the throttle valve would open if a disengagement thereof from the acclerator pedal system occurs.

SUMMARY OF THE INVENTION

It is, therefore, a principal object of the present invention to provide an improved apparatus for controlling an opening angle of an engine throttle valve which is simple in construction and can acheive multiple control functions.

The above-described object can be achieved by providing an apparatus for controlling an opening angle of a throttle valve installed in an intake air passage of an internal combustion engine, comprising: a) a single motor having a drive axle and a main body, said motor having a holding function such that the drive axle is held with respect to the main body and the drive axle thereof being linked to a rotation axle of the throttle valve so as to rotate the rotation axle of the throttle valve; b) biasing means for biasing the throttle valve in a direction so as to close the throttle valve; c) a manually operable acceleration mechanism linked to the main body of the motor so that the main body is interlocked and rotated with the manually operable acceleration mechanism; d) opening angle detecting means for detecting the opening angle of the throttle valve; and e) controlling means for selectively carrying out both of a first control such that, with the holding function of the drive axle of the motor released, the throttle valve is held at its closed position by means of a biasing force of the biasing means and a second control such that the drive axle of the motor is rotated according to the opening angle of the throttle valve detected by means of the opening angle detecting means, with the drive axle of the motor being held by a predetermined torque.

DESCRIPTION OF THE PREFERRED EMBODIMENT

Figure 1:
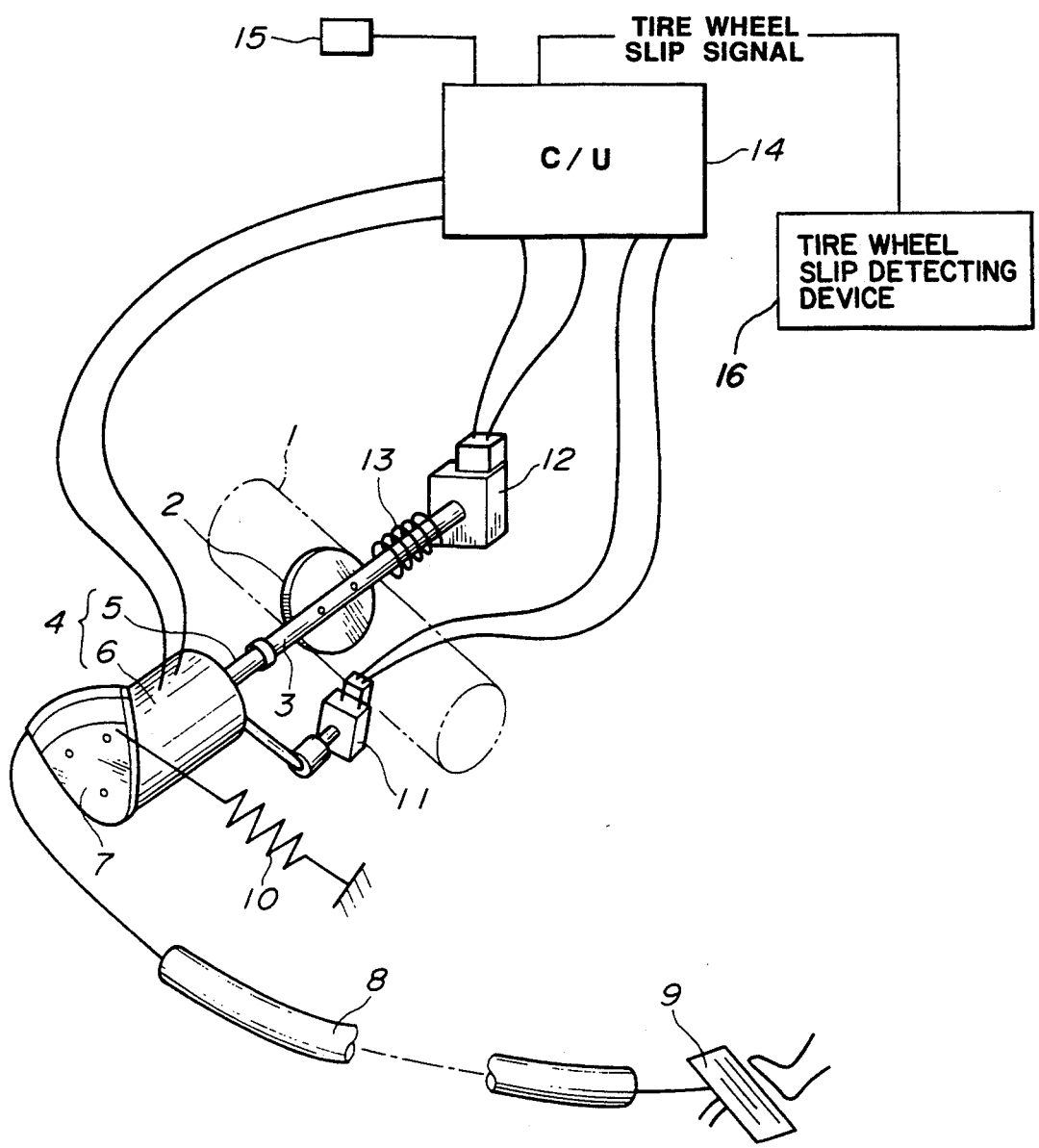
FIG. 1 is a schematic perspective view of an engine throttle valve opening angle controlling apparatus in a preferred embodiment according to the present invention.

Reference will hereinafter be made to the drawings in order to faciliate a better understanding of the present invention.

FIG. 1 shows a perferred embodiment of an engine throttle valve opening angle controlling apparatus.

In FIG. 1, a throttle valve 2 is installed in an intake air passage 1 linked to an engine main body (not shown) and a drive axle 5 of a motor 4 is linked with one end of a rotation axle 3 of the throttle valve 2.

The motor 4 has functions which can control a rotation quantity of the drive axle 5 and which can hold its angular rotational position of the drive axle 5 with respect to a main body 8 of the motor 4. An accelerator drum 7 is fixed to an end wall of the main body 6 of the motor 4. The accelerator drum 7 is linked with an accelerator pedal 9 of the engine mounted vehicle via an acceleration wire 8. In addition, the accelerator drum 7 is linked with a first return spring 10 which biases the main body 6 of the motor 4 in a direction of rotation which is the same as the closed direction of the throttle valve 2.

On the other hand, a rotation quantity sensor 11 is mounted in a space near to the motor 4 for detecting the rotation quantity of the main body 6 of the motor 4.

A throttle sensor 12 is installed at the other end of the rotation axle 3 of the throttle valve 2 for detecting an opening angle of the throttle valve 2. In addition, a second return spring 13 is wound around the other end of the rotation axle 3.

Detection signals of the rotation quantity sensor 11 and throttle sensor 12 are supplied to a control unit 14.

The control unit 14 receives detection signals derived from an engine revolution speed sensor 15 for detecting the engine revolution speed and from a tire wheel slip detection means ≠ ( the tire wheel slip can be detected from a difference in rotation speed between front and rear tire wheels) together with the above-described detection signals.

The control unit 14 serves to control an open/close drive of the throttle valve via the drive axle 5 by means of the motor 4 according to each detection signal.

Next, a control operation of the control unit will be described below.

In a case where the control unit 14 controls the opening angle of the throttle valve 2 interlocking with an acceleration operation by an ordinary vehicle driver, a predetermined torque causes the drive axle 5 of the motor 4 to be held with respect to the main body 6. It is noted that the predetermined torque is set larger than a maximum torque in the closed direction of the throttle valve 2 generated by means of the second return spring when the throttle valve 2 is fully open. In this way, when the accelerator pedal 9 is depressed, the drive axle 5 is rotated integrally with the main body 6 of the motor 4 via the accelerator drum 7 and acceleration wire 8. Therefore, the throttle valve 2 can be interlocked and driven to open or close.

However, in a case where the interlock of the throttle valve 2 begins in a midway through the accelerator pedal operation, before the drive axle 5 is held and in order to make a depression quantity (displacement) of the accelerator pedal 9 correspond to the opening angle of the throttle valve 2, the drive axle 5 may be driven until a relative rotation quantity between the drive axle 5 and main body 6 becomes equal to a difference between the rotation quantity of the main body 6 at the time when the accelerator pedal 9 is open and the opening angle of the throttle valve 2 when the throttle valve 2 is fully closed as a reference and thereafter may be held. Alternatively, the drive axle 5 may be held until the accelerator pedal 9 is open (released).

In a case where the control of the throttle valve is carried out so as to be interlocked with the accelerator pedal operation and, during execution of the above described control, such a traction control as to reduce the opening angle of the throttle valve 2 upon detection of the tire wheel slip is carried out, the motor 4 may be driven so as to gradually reduce the opening angle of the throttle valve 2, detecting the opening angle of the throttle valve 2. It is noted that in a case where the motor 4 serves to control the rotation quantity of the drive axle 5 with respect to the main body 6, a difference between the rotation quantity of the main body 6 of the motor 4 detected by means of the rotation quantity sensor 11 and the opening angle of the throttle valve 2 may be used to the control of the throttle valve opening angle.

On the contrary, in a method of feedback control such that the detected opening angle of the throttle valve 2 is coincident with a desired opening angle thereof without detection of the rotation quantity of the main body 6 of the motor 4, it is not necessary to detect the rotation quantity of the main body 6.

In addition, in a case where the cruise speed control is carried out with the accelerator pedal 9 released, the motor 4 may be driven to adjust the opening angle of the throttle valve 2 so that the present vehicle speed is held at a desired cruise speed.

Furthermore, the motor 4 may be driven, the rotation quantity sensor 11 detecting the acceleration quantity of the accelerator pedal 9, i.e., the rotation quantity of the main body 6, so that the opening angle of the throttle valve 2 becomes a set opening angle according to the acceleration quantity.

It is noted that both first and second return springs 10 and 13 function to bias the throttle valve 2 in the closed direction. Therefore, a high fail safe structure can be achieved. Since no engagement mechanism is provided, the structure of the throttle valve opening angle controlling apparatus can be simple and, hence, a reliability thereof is also high.

As described hereinabove, since, in the throttle valve opening angle controlling apparatus according to the present invention, the opening and closing of the throttle valve 2 interlocking with the accelerator pedal operation cannot only be acheived but also the single motor 4 can drive the throttle valve in both the open direction and the closed direction. It is possible to simultaneously carry out both traction control and automatic cruise speed control. If the acceleration operation quantity is detected by means of some electric component (e.g., potentiometer), any arbitrary characteristic of the throttle valve driving control can be achieved.

In addition, although the multiple function is provided, the structure of the throttle valve opening angle controlling apparatus becomes simplified, the high fail safe function, and high reliability can be achieved. In this way, various effects can be acheived.

It is noted that the structure of the traction control system is exemplified by a U.S. patent application Ser. No. 07/631,005 now U.S. Pat. No. 5,198,982 (attorney docket No. 16904/553) filed on Dec. 19, 1990, the disclosure of which is herein incorporated by reference and the automatic cruise control system is exemplified by a U.S. Pat. No. 4,908,764 issued on Mar. 13, 1990, the disclosure of which is herein incorporated by reference.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for controlling an opening angle of a throttle valve installed in an intake air passage of an internal combustion engine, comprising: a throttle valve having a pivotal axle;
   a) a single motor having a drive axle and a main body, said motor selectively performing a holding function such that the drive axle is held with respect to the main body, the drive axle being linked to the pivotal axle of the throttle valve so as to pivot the axle of the throttle valve to selectively open and close the throttle valve;
   b) biasing means for biasing the throttle valve in a direction so as to close the throttle valve;
   c) a manually operable acceleration mechanism linked to the main body of the motor so that the main body is interlocked and rotated with the manually operable acceleration mechanism;
   d) opening angle detecting means for detecting the opening angle of the throttle valve; and
   e) controlling means for selectively carrying out one of a first control such that, with the holding function of the drive axle of the motor released, the throttle valve is biased toward a closed position by means of a biasing force of the biasing means and the opening angle of the throttle valve is controlled in response to a control signal therefrom and controlled according to the opening angle detected by the throttle valve opening angle detecting means, and a second control such that the drive axle of the motor is rotated together with the main body of the motor and together with the acceleration of the manually operable acceleration mechanism, with the drive axle of the motor being held by a predetermined torque which is at least higher than the biasing force of the biasing means.

2. An apparatus for controlling an opening angle of a throttle valve installed in an intake air passage of an internal combustion engine as set forth in claim 1, which further comprises an accelerator drum fixed onto an end wall of the main body of the motor, the accelerator drum being linked to the manually operable acceleration mechanism via an accelerator wire.

3. An apparatus for controlling an opening angle of a throttle valve installed in an intake air passage of an internal combustion engine as set forth in claim 2, wherein said biasing means comprises: a first return spring linked to the accelerator drum so that the main body of the motor is biased in a direction which is the same as the closed direction toward which the throttle valve is closed; and a second return spring wound around one end of the pivotal axle of the throttle valve so that the throttle valve is biased in the closed direction thereof.

4. An apparatus for controlling an opening angle of a throttle valve installed in an intake air passage of an internal combustion engine as set forth in claim 3, which further includes tire wheel slip detecting means for detecting an occurrence of a tire wheel slip and wherein said controlling means carries out the first control when the tire wheel slip occurs.

5. An apparatus for controlling an opening angle of a throttle valve installed in an intake air passage of an internal combustion engine as set forth in claim 4, wherein when the manually operable acceleration mechanism is operated by a vehicular driver, the drive axle of the motor is held by the predetermined torque with respect to the main body of the motor and linked to the accelerator wire.

6. An apparatus for controlling an opening angle of a throttle valve installed in an intake air passage of an internal combustion engine as set forth in claim 5, wherein said predetermined torque is set larger that a maximum torque of the second return spring in the throttle valve closed direction generated when the throttle valve is fully open.

7. An apparatus for controlling an opening angle of a throttle valve installed in an intake air passage of an internal combustion engine as set forth in claim 6, wherein said second control is such that a vehicular speed is maintained at a desired cruise speed with the pivotal axle of the throttle valve being driven through the motor so as to coincide with a target opening angle, and wherein said first control is such that the opening angle of the throttle valve is returned to zero via the motor when the tire wheel slip occurs.

8. An apparatus for controlling an opening angle of a throttle valve installed in an intake air passage of an internal combustion engine as set forth in claim 7, which further includes a rotation quantity sensor for detecting a rotation quantity of the drive axle of the motor;

wherein said controlling means carries out either said first control or second control on the basis of a detection signal of said rotation quantity.

* * * * *